US010276286B2

(12) United States Patent
Lewicki et al.

(10) Patent No.: US 10,276,286 B2
(45) Date of Patent: Apr. 30, 2019

(54) POLYMER-CARBON COMPOSITES FOR TEMPERATURE-DEPENDENT ELECTRICAL SWITCHING APPLICATIONS

(71) Applicant: Lawrence Livermore National Security, LLC, Livermore, CA (US)

(72) Inventors: James Lewicki, Oakland, CA (US); Marcus A. Worsley, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 472 days.

(21) Appl. No.: 15/065,579

(22) Filed: Mar. 9, 2016

(65) Prior Publication Data
US 2017/0261456 A1    Sep. 14, 2017

(51) Int. Cl.
| H01B 1/06 | (2006.01) |
| H01B 1/24 | (2006.01) |
| H01C 7/00 | (2006.01) |
| H01H 37/32 | (2006.01) |
| C08J 5/00 | (2006.01) |

(52) U.S. Cl.
CPC .............. *H01C 7/008* (2013.01); *C08J 5/005* (2013.01); *H01B 1/24* (2013.01); *H01H 37/32* (2013.01); *C08J 2383/04* (2013.01)

(58) Field of Classification Search
CPC . G01N 27/14; C08K 3/04; H01B 1/24; H01C 7/008; H01H 37/32
See application file for complete search history.

(56) References Cited

U.S. PATENT DOCUMENTS

| 8,968,605 B2 | 3/2015 | Yue et al. |
| 9,087,625 B2 | 7/2015 | Worsley et al. |
| (Continued) | | |

FOREIGN PATENT DOCUMENTS

CN    103073891 A    5/2013

OTHER PUBLICATIONS

Deng et al., "Progress on the morphological control of conductive network in conductive polymer composites and the use as electroactive multifunctional materials," Progress in Polymer Science, vol. 39, No. 4, 2014, pp. 627-655.
(Continued)

*Primary Examiner* — Bijan Ahvazi
(74) *Attorney, Agent, or Firm* — Foley & Lardner LLP

(57) ABSTRACT

Disclosed here is a method for sensing temperature-dependent electrical switching response, comprising: exposing a polymer-carbon composite to a temperature change, wherein the polymer-carbon composite comprises (a) a semi-conductive or conductive carbon network intercalated with (b) a polymer matrix, wherein the carbon network comprises at least one covalently bonded carbon material, and wherein the polymer matrix comprises at least one polymer having a net electron withdrawing character and adapted to apply a gating effect on the conductive carbon; and detecting a change in electrical conductivity of the polymer-carbon composite of at least three orders of magnitude. Also disclosed is a smart switching device comprising the polymer-carbon composite and a switch triggerable by an increase or decrease in electrical conductivity of the polymer-carbon composite of at least three orders or magnitude.

20 Claims, 5 Drawing Sheets

(56) References Cited

U.S. PATENT DOCUMENTS

2011/0024698 A1     2/2011    Worsley et al.
2012/0037854 A1     2/2012    Worsley et al.

OTHER PUBLICATIONS

Fan et al., "Advanced multifunctional graphene aerogel—Poly(methyl methacrylate) composites: Experiments and modeling," Carbon, vol. 81, 2015, pp. 396-404.

Feng et al., "Double positive temperature coefficient effects of carbon black-filled polymer blends containing two semicrystalline polymers," Polymer, vol. 41, No. 12, 2000, pp. 4559-4565.

Fung et al., "Characterization of carbon aerogels by transport measurements," Journal of Materials Research, vol. 8, No. 8, 1993, pp. 1875-1885.

Kenig et al., "3-phase carbon microballoon syntactic foam composites," Polymer Composites, vol. 6, No. 2, 1985, pp. 100-104.

Klason et al., "Anomalous behavior of electrical-conductivity and thermal noise in carbon black-containing polymers at Tg and Tm," Journal of Applied Polymer Science, vol. 19, No. 3, 1975, pp. 831-845.

Lewicki et al., "Novel hierarchical composites of inorganic carbon and polysiloxanes for next-generation energy applications," 249th ACS National Meeting & Exposition, Denver, CO, United States, Mar. 22-26, 2015.

Lewicki et al., "Smart composites. The synthesis, characterization and application of well-defined, hierarchical silicone/carbon architectures with novel physical properties", 1st International Symposium on Energy Challenges and Mechanics. Aberdeen, Scotland, Jul. 8-10, 2014.

Li et al., "Easy fabrication and resistivity-temperature behavior of an anisotropically conductive carbon nanotube-polymer composite," Journal of Physical Chemistry B, vol. 114, No. 2, 2010, pp. 689-696.

Li et al., "Resistivity-temperature behavior of CB-filled HDPE foaming composites," Chemical Research in Chinese Universities, vol. 24, No. 2, 2008, pp. 215-219.

Liu et al., "Electro-active shape memory composites enhanced by flexible carbon nanotube/graphene aerogels," Journal of Materials Chemistry A, vol. 3, No. 21, 2015, pp. 11641-11649.

Meyer et al., "Glass transition temperature as a guide to selection of polymers suitable for PTC materials," Polymer Engineering and Science, vol. 13, No. 6, 1973, pp. 462-468.

Meyer et al., "Stability of polymer composites as positive-temperature-coefficient resistors," Polymer Engineering and Science, vol. 14, No. 10, 1974, pp. 706-716.

Narkis et al., "Electrical-properties of carbon-black filled polyethylene," Polymer Engineering and Science, vol. 18, No. 8, 1978, pp. 649-653.

Pang et al., "Temperature resistivity behaviour in carbon nanotube/ultrahigh molecular weight polyethylene composites with segregated and double percolated structure," Plastics Rubber and Composites, vol. 42, No. 2, 2013, pp. 59-65.

Tan et al., "Study of the morphology and temperature-resistivity effect of injection-molded iPP/HDPE/CB composites," Polymer Bulletin, vol. 72, No. 7, 2014, pp. 1711-1725.

Tang et al., "Three dimensional graphene aerogels and their electrically conductive composites," Carbon, vol. 77, 2014, pp. 592-599.

Wang et al., "Graphene aerogel/epoxy composites with exceptional anisotropic structure and properties," Acs Applied Materials & Interfaces, vol. 7, No. 9, 2015, pp. 5538-5549.

Worsley et al., "Smart composites. The synthesis, characterization and application of well-defined, hierarchical silicone/carbon architectures with novel physical properties," Fourth International Conference on Multifunctional, Hybrid and Nanomaterials. Sitges, Spain, Mar. 9-13, 2015.

Xiang et al., "Negative temperature coefficient of resistivity in lightweight conductive carbon nanotube/polymer composites," Macromolecular Materials and Engineering, vol. 294, No. 2, 2009, pp. 91-95.

Zeng et al., "Low-voltage and high-performance electrothermal actuator based on multi-walled carbon nanotube/polymer composites," Carbon, vol. 84, 2015, pp. 327-334.

Zhang et al., "Study on filler content dependence of the onset of positive temperature coefficient (PTC) effect of electrical resistivity for UHMWPE/LDPE/CF composites based on their DC and AC electrical behaviors," Polymer, vol. 55, No. 8, 2014, pp. 2103-2112.

Zhang et al., "Temperature and time dependence of electrical resistivity in an anisotropically conductive polymer composite with in situ conductive microfibrils," Journal of Applied Polymer Science, vol. 124, No. 3, 2012, pp. 1808-1814.

POLYMER-CARBON COMPOSITES FOR TEMPERATURE-DEPENDENT ELECTRICAL SWITCHING APPLICATIONS

BACKGROUND

Polymeric materials have been classically considered to be passive. A polymeric material which can exhibit an active response to its environment, including temperature, has a wide range of potential applications based on the response, type, factor and the physical properties of the polymer-based system.

Temperature-dependent conductivity and associated "switching" responses in solid-state bulk polymeric composite materials are known in the literature and find application in many fields including sensing and actuation. There abound various examples of so-called positive temperature coefficient (PTC) and negative temperature coefficient (NTC) materials, which exhibit often abrupt increases or decreases in electrical conductivity as a function of temperature. The switching response of known PTC and NTC material are exclusively based on a physical perturbation of a conductive phase within a non-conductive matrix and the associated reversible or irreversible breakdown or establishment of a percolative network of conductive nodes, as a consequence of thermal expansion, contraction or phase change in the non-conductive phase.

One example of such a system with an irreversible or high hysteresis PTC response would be the thermal fuse type system whereby a bound, percolative 3D network of conductive particles (e.g., carbon black) in a non-conductive polymer matrix suffers an irreversible breakdown in percolation with the consequential loss of conductivity of the device, when the system is exposed to temperatures in excess of a predefined expansion limit of the composite. See Feng et. al., *Polymer*, 41(12):4559-4565 (2000).

Less common are reversible NTC response materials. Xiang et. al., *Macromol. Mater. Eng.*, 294:91-95 (2009) recently demonstrated a polymeric foam/CNT composite device that exhibited temperature dependent increases in electrical conductivity as a result of expansion of the gas-filled closed cell structure of the polymeric foam increasing the contact order of a discrete conductive CNT phase within the polymer matrix. While such demonstrations are both useful and relevant, the primary mode of switching response in such materials was the physical onset or breakdown of a percolative particle dispersion in a contiguous non-conductive matrix. As such the magnitude, repeatability and timescale of the temperature-dependent response are questionable, due in the mainstay to the complexities and uncertainties associated with the physical and often fractal filler networks and their associated aging response (e.g., Mullin effect and Payne effect). However, rapid response, large magnitude reversible and hysteresis free NTC type behavior is beyond the scope of such known "percolative" switching composite devices.

SUMMARY

Disclosed here is a polymer-carbon composite exhibiting a large temperature dependent conductivity response. In contrast to other related systems, the conductivity of the polymer-carbon composite described herein increases or decreases markedly as a function of increasing or decreasing temperature respectively and is directly linked to thermal phase transition of the polymeric component.

Therefore, one aspect of some embodiments of the invention relates to a method for sensing temperature-dependent electrical switching response, comprising: exposing a polymer-carbon composite to a temperature change, wherein the polymer-carbon composite comprises (a) a semi-conductive or conductive carbon network intercalated with (b) a polymer matrix, wherein the carbon network comprises at least one covalently bonded carbon material, and wherein the polymer matrix comprises at least one polymer having a net electron withdrawing character and adapted to apply a gating effect on the carbon network; and detecting a change in electrical conductivity of the polymer-carbon composite of at least three orders of magnitude.

Another aspect of some embodiments of the invention relates to a smart switching device comprising a polymer-carbon composite comprising (a) a semi-conductive or conductive carbon network intercalated with (b) a polymer matrix, wherein the carbon network comprises at least one covalently-bonded carbon material, and wherein the polymer matrix comprises at least one polymer having a net electron withdrawing character and adapted to apply a gating effect on the carbon network, and a switch triggerable by an increase or decrease in electrical conductivity of the polymer-carbon composite of at least three orders or magnitude.

Another aspect of some embodiments of the invention relates to a warning system comprising the smart switching device connected to a warning component, wherein the warning system is configured to produce a warning signal when the temperature is above or below a safety range or when the electrical conductivity exceeds or drops below a predetermined threshold.

Another aspect of some embodiments of the invention relates to an actuation system comprising the smart switching device connected to an actuation component, wherein the actuation system is configured to produce a actuation signal when the temperature is above or below a desired range or when the electrical conductivity exceeds or drops below a predetermined threshold.

These and other features, together with the organization and manner of operation thereof, will become apparent from the following detailed description when taken in conjunction with the accompanying drawings.

DETAILED DESCRIPTION

Figure 1:
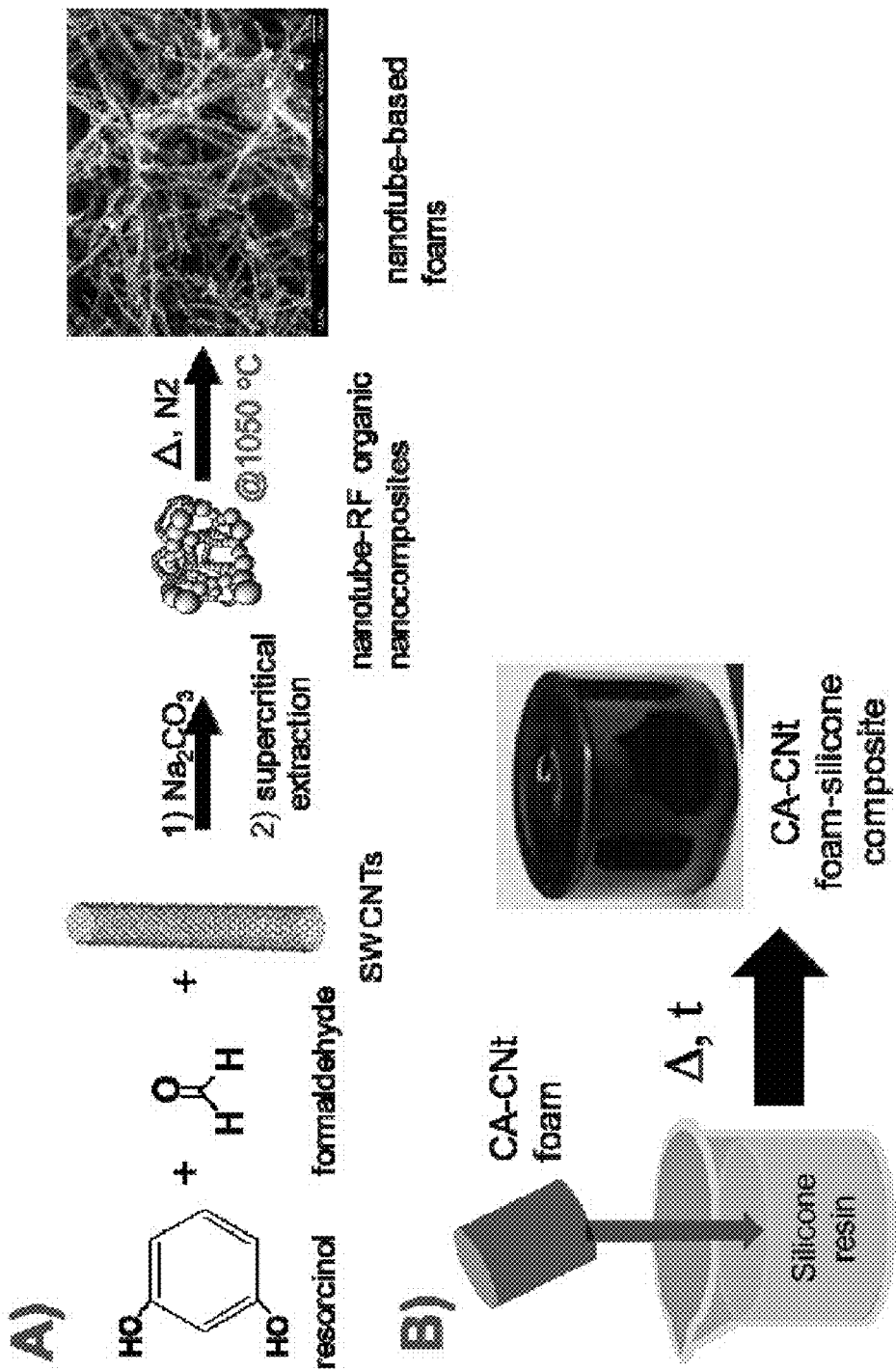
FIG. 1 is an overview of synthetic scheme for composite synthesis. Established sol-gel chemistries are used to form CA/CNT aerogels, which are intercalated with a tailored silicone pre-polymer which forms a secondary phase in the free space of the aerogel.

Reference will now be made in detail to some specific embodiments of the invention contemplated by the inventors for carrying out the invention. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Disclosed here is the first example of a polymeric composite material showing a large, reversible and near hysteresis free, thermally dependent electronic conductivity response, wherein the material exhibits an increase in electrical conductivity of over four orders of magnitude on passing from glassy phase to amorphous elastomeric phase. Through the synthesis and incorporation of a unique inorganic, covalently bound 3D framework of carbon nanotubes within an interpenetrating end-linked polysiloxane network, a new class of hierarchical organic/inorganic composite system can be obtained, which acts as a strong negative temperature coefficient electronic material. Based on experimental characterization and computational models, it is believed that the unprecedented electronic effect arises as a result of volume mediated gating of the semiconducting nanotube network by the polymer network. The temperature-dependent electrical switching effects of the polymer-carbon composite described herein can be attributed to the resistance of the covalently bound, contiguous nanotube network to percolative breakdown as the polymer free volume increases on passing through the glass to rubber phase, in contrast to known PTC and NTC materials.

Polymer-Carbon Composite

Many embodiments of the invention described herein relates to a polymer-carbon composite which exhibits a large and tunable temperature dependent electrical switching response. In some embodiments, the polymer-carbon composite comprises (a) a semi-conductive or conductive carbon network intercalated with (b) a polymer matrix.

In some embodiments, the carbon network comprises at least one covalently bonded carbon material. In some embodiments, the carbon network comprises carbon nanotube (CNT) bundles covalently crosslinked by carbon nanoparticles. In some embodiments, the carbon network comprises single-walled carbon nanotube bundles covalently crosslinked by carbon nanoparticles. In some embodiments, the carbon network comprises double-walled or multi-walled carbon nanotube bundles covalently crosslinked by carbon nanoparticles. In some embodiments, the carbon network is a monolithic CNT-CA aerogel as described in US Pat. Pub. No. 2010/0187484, which is incorporated herein by reference in its entirety.

In some embodiments, the carbon network comprises graphene sheets covalently crosslinked by carbon nanoparticles. In some embodiments, the carbon network comprises graphene sheets directly crosslinked with each other by covalent carbon bonds. In some embodiments, the carbon network is a monolithic graphene aerogel as described in US Pat. Pub. No. 2012/0034442, which is incorporated herein by reference in its entirety.

In some embodiments, the carbon network is thermally stable. In some embodiments, the carbon network remains a covalently crosslinked carbon structure after being heated for 1 hour at a temperature of about 200° C., about 300° C., or about 400° C., or about 500° C., or about 600° C.

In some embodiments, the polymer matrix comprises at least one polymer having a net electron withdrawing character and adapted to apply a gating effect on the semiconductive or conductive carbon network. In some embodiments, the polymer matrix comprises at least one polymer capable of going through glass to rubber phase transitions (Tg) and/or crystallization/crystalline melting transitions (Tm). In some embodiments, the polymer matrix comprises a covalently cross-linked polymeric network. In some embodiments, the polymer matrix comprises a physically entangled polymeric network. In some embodiments, the polymer matrix comprises a polymer that is either fully amorphous or semi-crystalline and has at least one phase transition accompanied by a significant change in density, free volume and motional chain backbone freedom per unit time. In some embodiments, the polymer matrix comprises a polymer having a net electron withdrawing character with through chain backbone, substituent, branch or network chemistry contributions.

In some embodiments, the polymer matrix comprises polysiloxanes such as polydimethylsiloxane (PDMS). In some embodiments, the polymer matrix comprises an end-linked polysiloxane elastomeric network. In some embodiments, the polymer matrix comprises a polyurethane. In some embodiments, the polymer matrix comprises an epoxy resin. In some embodiments, the polymer matrix comprises a fluoropolymer. In some embodiments, the polymer matrix comprises a polyolefin such as a polyoxymethylene substituted polyolefin. In some embodiments, the polymer matrix comprises an acrylate polymer. In some embodiments, the polymer matrix is selected from thermoplastics, thermosets, copolymer and terpolymer blends.

In some embodiments, the polymer-carbon composite is a monolith. In some embodiments, the polymer-carbon composite has at least one dimension of at least about 0.1 cm, or at least about 0.5 cm, or at least about 1 cm, or at least about 5 cm. In some embodiments, the polymer-carbon composite has at least two dimensions of at least about 0.1 cm, or at least about 0.5 cm, or at least about 1 cm, or at least about 5 cm. In some embodiments, the polymer-carbon composite has at least three dimensions of at least about 0.1 cm, or at least about 0.5 cm, or at least about 1 cm, or at least about 5 cm.

In some embodiments, the carbon network is intercalated with the polymer matrix throughout the thickness of the polymer-carbon composite. In some embodiments, the carbon network is embedded in the polymer matrix throughout the thickness of the polymer-carbon composite. In some embodiments, the polymer matrix is embedded in the carbon network throughout the thickness of the polymer-carbon composite. In some embodiments, the intercalation between the carbon network and the polymer matrix is substantially homogenous.

In some embodiments, the polymer-carbon composite is insulating at a first temperature below Tg of the polymer and is semiconducting or conducting at a second temperature above Tg of the polymer. The difference between the first temperature and the second temperature can be, for example, about 50 degrees or less, or about 40 degrees of less, or about 30 degrees or less, or about 20 degrees or less.

In some embodiments, the polymer-carbon composite has a first electrical conductivity at a first temperature and a second electrical conductivity at a second temperature, wherein the second electrical conductivity is at least one order of magnitude higher than the first electrical conductivity, and wherein the second temperature is higher than the first temperature. In some embodiments, the second electrical conductivity is at least two orders of magnitude higher than the first electrical conductivity, and the difference between the first temperature and the second temperature is about 50 degrees or less, or about 40 degrees of less, or about 30 degrees or less, or about 20 degrees or less. In some embodiments, the second electrical conductivity is at least three orders of magnitude higher than the first electrical conductivity, and the difference between the first temperature and the second temperature is about 50 degrees or less, or about 40 degrees of less, or about 30 degrees or less, or about 20 degrees or less. In some embodiments, the second electrical conductivity is at least four orders of magnitude higher than the first electrical conductivity, and the difference between the first temperature and the second temperature is about 50 degrees or less, or about 40 degrees of less, or about 30 degrees or less, or about 20 degrees or less.

In some embodiments, the change in electrical conductivity of the polymer-carbon composite is substantially free of hysteresis for at least about 5 cycles, or at least about 10 cycles, or at least about 20 cycles, or at least about 50 cycles, or at least about 100 cycles.

In some embodiments, the thermo-electronic switching response is primarily a function of the semi-conductive or conductive carbon network and its interaction with the surrounding polymer matrix. The carbon network can be semi-conducting or conducting and therefore may be gated by close association with electron withdrawing species. Reduction in the unit volume level of association between the nanotube network and the electron withdrawing matrix will therefore result in the loss of the gating effect and a net increase in conductivity. The use of a polymeric phase allows favorable macro materials functionality (e.g., strength flexibility, processability and thermal stability). It also allows one to take advantage, in a device or application of the highly repeatable and reversible phase change associated volume and density shifts associated with the beta, glass and melting transitions in polymeric materials that are thermal activated and accompanied by often large changes in the association level between the polymer matrix and the nanotube network.

Synthesis of Polymer-Carbon Composite

The polymer-carbon composite described herein differs significantly from known PTC and NTC materials in that it exhibits a strong hysteresis free NTC effect that is a result of semiconductor gating of a contiguous CNT-CA network by a polymer phase rather than relying on the establishment or breakdown of a physical percolative network of conductive particles. It is believed that this unique hybrid structure of a covalently bound carbon network intercalated with a polymeric phase leads to the unprecedented hysteresis-free response. A unique synthesis route has been developed for the formation of these composites leading to the particular structure that gives the strong hysteresis-free NTC response.

In some embodiments, the polymer-carbon composite described herein is synthesized based on two materials (A+B) physically incorporated to form a single composite.

Material (A) can be a polymeric network either covalently cross-linked or physically entangled, which is capable of going through glass to rubber phase transitions (Tg) and/or crystallization/crystalline melting transitions (Tm). In some embodiments, material (A) is an end-linked polysiloxane elastomeric network. In some embodiments, material (A) is selected from thermoplastics, thermosets, copolymer and terpolymer blends. In some embodiments, material (A) is selected from polyurethanes, epoxy resins, fluoropolymers, and polyolefins.

Material (B) can be a contiguous low density covalently bound network of semiconducting carbon nanotubes, including single walled carbon nanotubes (SWNTs). In some embodiments, material (B) is a carbon aerogel/CNT foam. In some embodiments, material (B) is a graphene aerogel or a reduced graphene macro-assembly.

Figure 2:
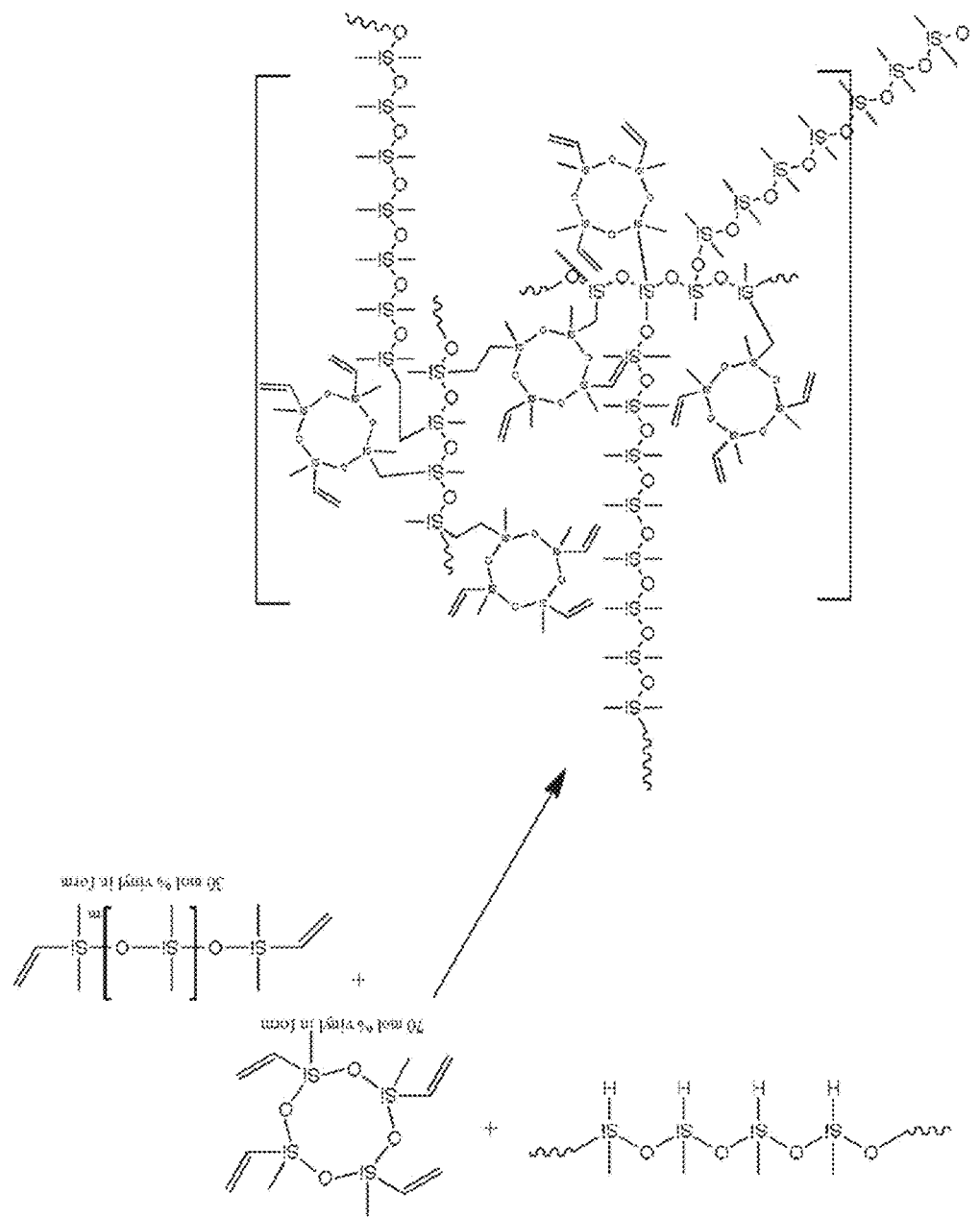
FIG. 2 shows highly x-linked 'knot' formation driven by high molecular ratio cyclic vinyl. Knot formation reaction not shown at completion for clarity. As the major molecular fraction of vinyl groups are found on the cyclic vinyl, the network structure builds in the depicted manner.

As shown in FIG. 2, in one embodiment, a low viscosity system that cures to a hard rubber can be used to intercalate a CNT-CA network. The base formulation can be unfilled and have a very low starting viscosity; however, it can be designed so that on curing it forms in situ highly x-linked domains which are large enough to scatter visible light. It can be a hybrid system with in situ filler like qualities. The base formulation can have a linear vinyl terminated PDMS resin and 2% of a cyclic tetra-functional vinyl x-linker, both of which are stoichiometrically balanced with a silane comb oligomer. It is believed that the structure that forms can be under a vinyl molecular ratio control, with the silane comb acting as the reactive center for the addition of vinyl cyclic. The reaction can be catalyzed by a Pt based Karstedt's catalyst. Due to the presence of cyclic vinyl siloxanes and their action on the Pt, this formulation can have a long "pot-life" at room temperature, while cures rapidly at temperatures in excess of 60° C. These properties allow the successful intercalation within the CNT-CA aerogel.

Intercalation can proceed via a multi-stage process. The aerogel foam can be placed in a bath of the liquid resin at a temperature of about −5° C., and vacuum can be applied for 1 hour with a physical weight holding the aerogel below the liquid surface. Vacuum can then be released and the part can be agitated gently in the polymer bath. The process can be repeated 5-10 times depending on the surface to volume ratio of the part. The polymer can be slowly exchanged with air in the free spaces of the aerogel using this method, while the low temperature can ensure that the resin does not prematurely polymerize.

After intercalation of the liquid is complete, the temperature of the resin can be increased to about 80° C., and the network formation reaction is completed when an elastomeric network forms. The formed polysiloxane/CNT-CA composite can be extracted from the pure silicone resin physically, sectioned and assembled with appropriate metallic contacts for analysis and testing.

Additional methods for synthesizing polymer-carbon composites are described in US Pat. Pub. No. 2012/0037854, which is incorporated herein by reference in its entirety.

Method for Sensing Temperature-Dependent Electrical Switching Response

Many embodiments of the invention relates to a method for sensing temperature-dependent electrical switching response comprising: exposing the polymer-carbon composite described herein to a temperature change; and detecting a change in electrical conductivity of the polymer-carbon composite of at least about one order of magnitude.

In some embodiments, the method comprises exposing the polymer-carbon composite to a temperature change of or about 10 degrees or more, or about 20 degrees or more, or about 30 degrees or more, about 50 degrees or more, or about 200 degrees or less, or about 100 degrees or less, or about 50 degrees or less, or about 30 degrees or less.

In some embodiments, the method comprises detecting a change in electrical conductivity of the polymer-carbon composite of at least about two orders of magnitude, or at least about three orders of magnitude, or at least about four orders of magnitude.

In some embodiments, the polymer-carbon composite is initially disposed in an environmental having a temperature lower than Tg of the polymer matrix, wherein a temperature increase to higher than the Tg triggers an increase of electrical conductivity of the polymer-carbon composite of at least about one order of magnitude, or at least about two orders of magnitude, or at least about three orders of magnitude, or at least about four orders of magnitude, which can be detected using a suitable device.

In some embodiments, the polymer-carbon composite is initially disposed in an environmental having a temperature higher than Tg of the polymer matrix, wherein a temperature decrease to lower than the Tg triggers an decrease of electrical conductivity of the polymer-carbon composite of at least about one order of magnitude, or at least about two orders of magnitude, or at least about three orders of magnitude, or at least about four orders of magnitude, which can be detected using a suitable device.

In some embodiments, the method further comprises producing a warning signal when the electrical conductivity exceeds or drops below a predetermined threshold.

In some embodiments, the method further comprises producing an actuation signal when the electrical conductivity exceeds or drops below a predetermined threshold.

Smart Switching Device

Many embodiments of the invention relates to a smart switching device comprising the polymer-carbon composite described herein, and a switch triggerable by an increase or decrease in electrical conductivity of the polymer-carbon composite of at least about one order or magnitude.

In some embodiments, the switch is triggerable by an increase or decrease in electrical conductivity of the polymer-carbon composite of at least about two orders of magnitude, or at least about three orders of magnitude, or at least about four orders of magnitude.

In some embodiments, the smart switching device is connected to or part of a warning system that is configured to produce a warning signal when a temperature is above or below a safety range or when the electrical conductivity exceeds or drops below a predetermined threshold.

In some embodiments, the smart switching device is connected to or part of an actuation system that is configured to produce a actuation signal when a temperature is above or below a desired range or when the electrical conductivity exceeds or drops below a predetermined threshold.

Additional Applications

The composites and methods described herein have a variety of applications, including polymeric sensors (e.g., temperature, mechanical stress, damage, ingress or egress of solvents, water, environmental and atmospheric contaminants); thermal fuse system for HE composites; means of controlled sensitization of HE composites; polymeric NTC thermistors; electronic switching material for flextronics; self-sensing/self-reporting polymeric systems (e.g., materials for stress cushions, gaskets, seals, etc., that are capable of self-sensing a range of phase transitions and mechanical/environmental changes).

They can also be used with dielectric elastomers for applications in haptic feedback, pumps, valves, robotics, active origami-inspired structure, prosthetics, power generation, active vibration control of structures, optical positioners (e.g., for auto-focus, zoom, image stabilization), sensing of force and pressure, active braille displays, speakers, deformable surfaces for optics and aerospace, energy harvesting, noise-canceling windows, display-mounted tactile interfaces, and adaptive optics.

WORKING EXAMPLES

Example 1

Materials

All reagents were used without further purification. Resorcinol (99%) and formaldehyde (37% in water) were purchased from Aldrich Chemical Co. Sodium carbonate (anhydrous) was purchased from J.T. Baker Chemical Co. Highly purified CNTs were purchased from Carbon Solutions, Inc. Vinyl terminated PDMS of average molar mass 28 Kg mol$^{-1}$, Poly(methylhydrosilane) of average molar mass 2.45 Kg mol$^{-1}$, tetravinyl-tetramethylcyclo-tetrasiloxane and a platinum cyclovinylmethylsiloxane complex were all purchased from Gelest Inc.

Example 2

Preparation of CNT-CA Nanofoams

As shown in FIG. 1(A), CNT-CA nanofoams were prepared using traditional organic sol-gel chemistry. In a typical reaction, purified CNTs (Carbon Solutions, Inc.) were suspended in deionized water and thoroughly dispersed using a sonication bath (sonic power ~90 W, frequency ~40 kHz). The concentration of CNTs in the reaction mixture ranged from 0 wt % to 1.3 wt %. The sonication times for dispersing CNTs ranged from 4 h to 24 h. Once the CNTs were dispersed, resorcinol (1.235 g, 5.6 mmol), formaldehyde (1.791 g, 11.1 mmol), and sodium carbonate catalyst (5.95 mg, 0.028 mmol) were added to the reaction solution. The resorcinol to catalyst ratio (R/C) employed for the synthesis of the composites was 200. The sol-gel mixture was then transferred to glass moulds, sealed and cured in an oven at 85° C. for 72 h. The resulting gels were then removed from the moulds and washed with acetone for 72 h to remove water from the pores of the gel network. The wet gels were subsequently dried with supercritical $CO_2$ and pyrolyzed at 1050° C. under a $N_2$ atmosphere for 3 h. The composite materials were isolated as black cylindrical monoliths. Foams with CNT loadings ranging from 0 to ~80 wt. % were prepared by this method.

Example 3

Preparation of PDMS/CNT-CA Composites

As shown in FIG. 2, an end-linked, hybrid tetra/comb crosslinked network was developed that formed via a platinum mediated vinyl addition reaction between vinyl terminated poly(dimethylsiloxane) (PDMS), 2 wt. % tetravinyltetramethylcyclo-tetrasiloxane (which acts as a cure rate moderator) and a stoichiometric level of an oligomeric poly(methylhydrosilane). This network formulation was designed to have an initially low starting viscosity, a pot-life of ~4 days at room temperature and a high final crosslink density. These properties make it an ideal material for controlled intercalation into the CNT-CA monoliths.

In order to prepare a PDMS/CNT-CA composite system, 9.8 g of vinyl terminated PDMS and 0.2 g of tetravinyl-tetramethylcyclo-tetrasiloxane were combined with a stoichiometric level of poly(methylhydrosilane) crosslinker in the presence of 10 ppm of a Pt cyclovinylmethylsiloxane complex and mixed for 30 s at a rate of 2500 rpm. The mixed resin was then cooled in an ice-bath to a temperature of 5° C.

As shown in FIG. 1(B), CNT-CA monolith was immersed fully into the cooled resin and placed under vacuum for 2 h at 5° C. to begin the process of exchanging the air in the monolith with the resin mixture. When bubbling was observed to cease from the monolith in the resin bath, the sample was brought up to atmospheric pressure, agitated gently and returned to vacuum. Five such cycles were repeated to ensure that the polymer resin had fully penetrated the nanofoam matrix. Once the intercalation stage was completed, the resin containing the CNT-CA monolith was brought up to a temperature of 50° C. and allowed to cure for 24 h to form a solid elastomeric block. The cured, intercalated monolith was subsequently cut from the elastomer using a scalpel and each recovered cylinder of PDMS/CNT-CA composite was sectioned longitudinally to ensure that the intercalation of the polymer into the matrix was complete and homogeneous. The PDMS/CNT-CA composite was assembled with appropriate metallic contacts for analysis and testing.

EXAMPLE 4

Characterization of PDMS/CNT-CA Composites

Figure 3:
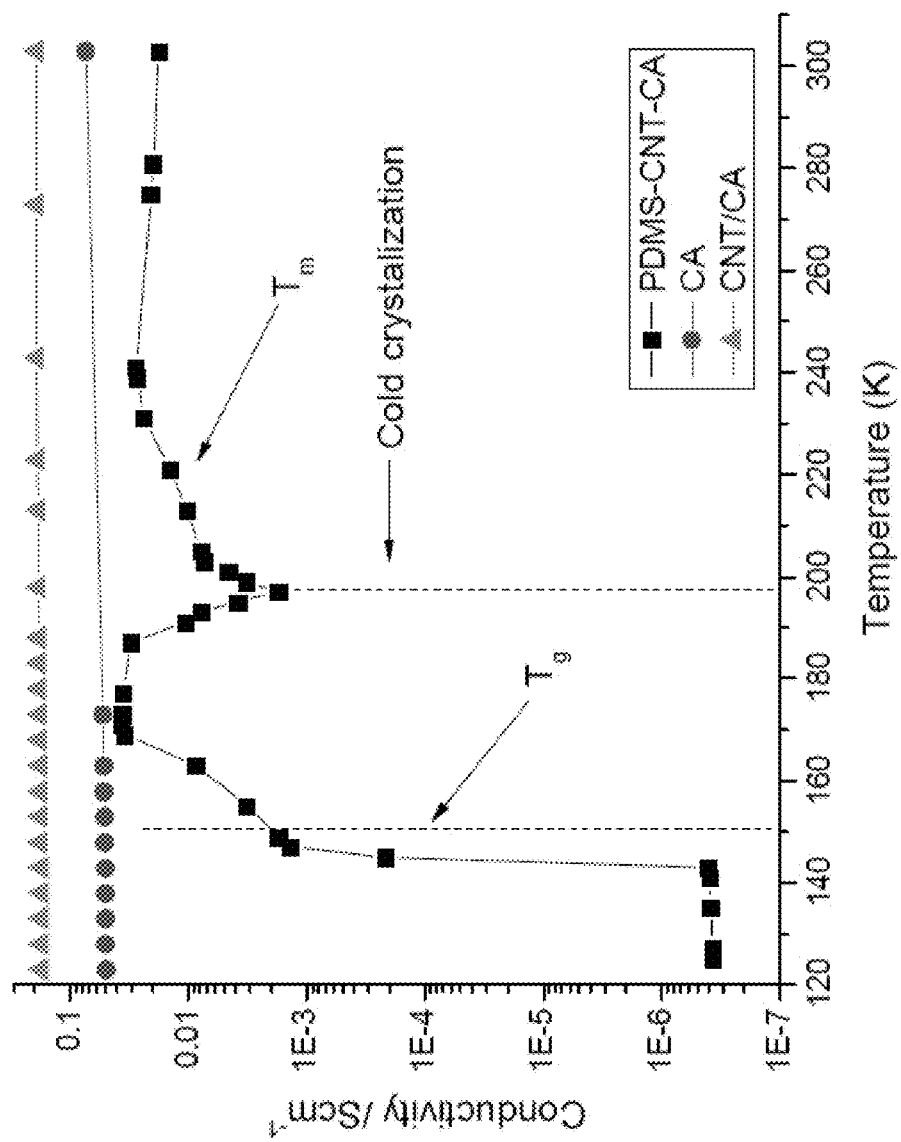
FIG. 3 shows a PDMS-CNT-CA system exhibiting an increase in conductivity of five orders of magnitude on passing through the Tg of the network. Also observed are the effects of cold-crystallization and subsequent melting on the conductance response.

As shown in FIG. 3, the electrical performance of an assembled device exhibited a strong NTC effect. The electrical conductivity of the composite varied dramatically as a function of temperature. The electrical conductivity of the composite increased 5 orders of magnitude on passing through the Tg. The electrical conductivity of the composite dropped an order of magnitude on cold crystallization and recovered on Tm. This demonstrates a self-sensing phase transition material with a strong NTC response.

Figure 4:
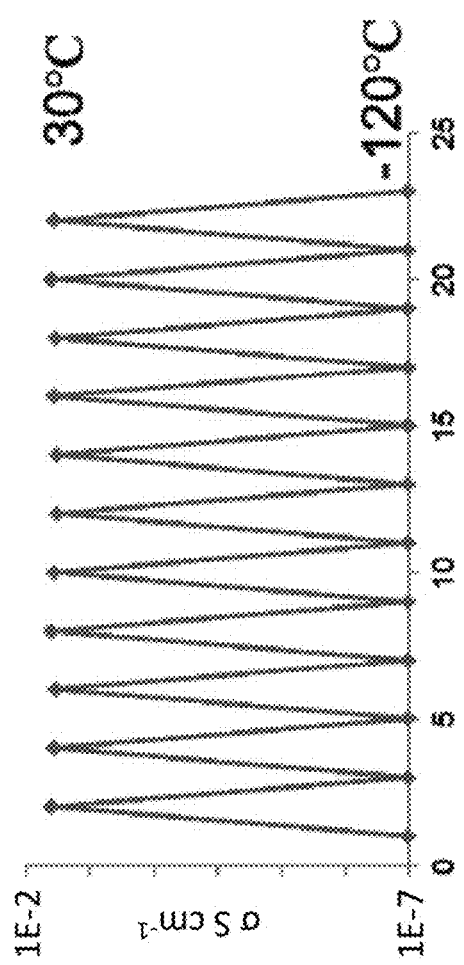
FIG. 4 shows NTC response as a function of temperature cycle (x-axis) for an assembled device.

As shown in FIG. 4, the NTC response is free of hysteresis on repeated cycles. This indicates this unique NTC response is a result of a semiconductor gating effect of the polymer phase on the aerogel network.

Figure 5:
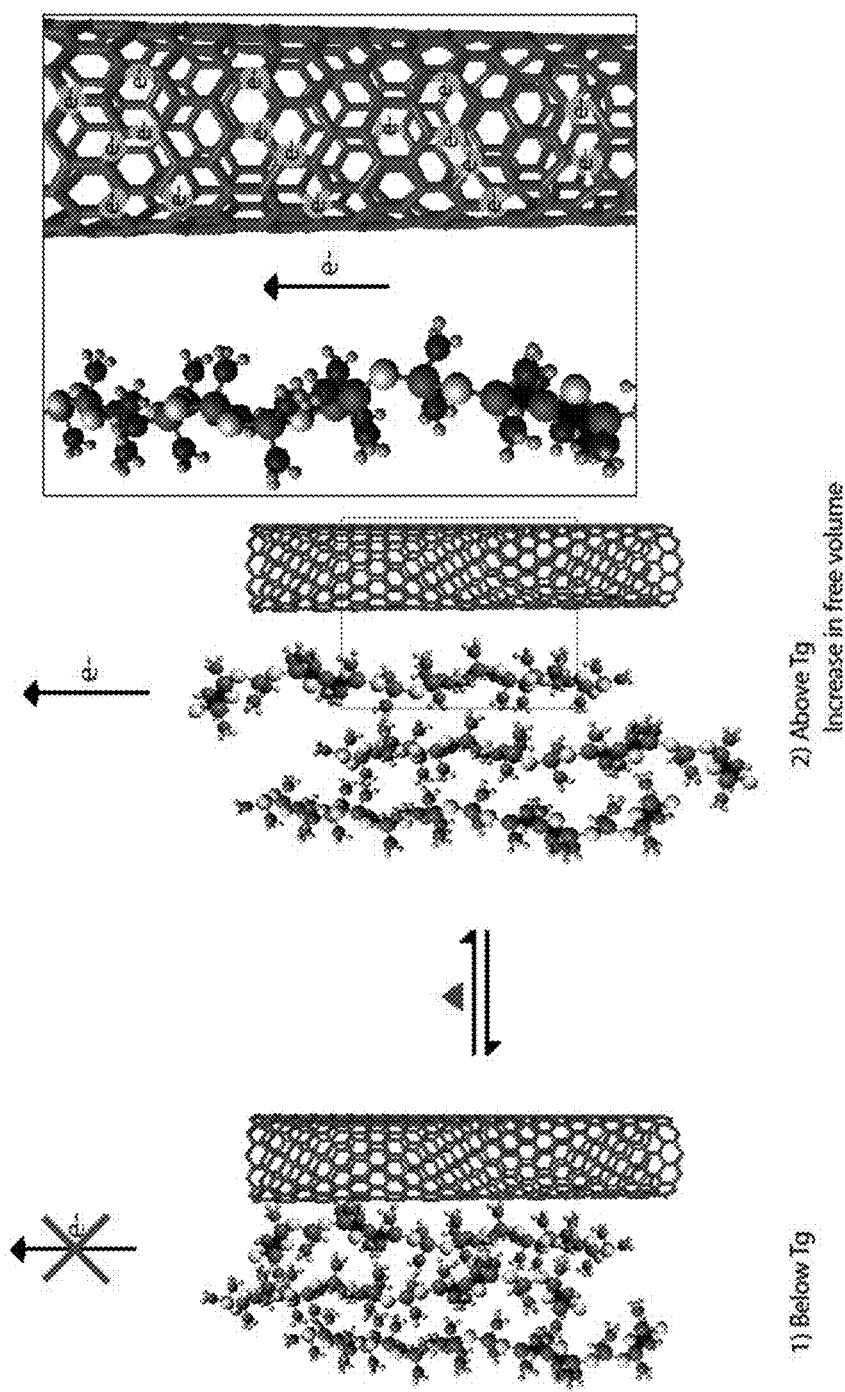
FIG. 5 depicts that the physical adsorption and close packing of the silicone chains below Tg (shown) and in a crystalline state (not shown) quench the conducting mode of the nanotubes via withdrawing electron density. Increases in free volume and associated decreases in chain adsorption turn off the gating mode, allowing the conduction mode of the nanotube network to dominate.

As depicted in FIG. 5, the physical adsorption and close packing of the silicone chains below Tg (shown) and in a crystalline state (not shown) quench the conducting mode of the nanotubes via withdrawing electron density. Increases in free volume and associated decreases in chain adsorption turn off the gating mode, allowing the conduction mode of the nanotube network to dominate. This is believed to be a novel NTC mechanism emergent from the properties of nanotube network—a covalently bound 3D contiguous conductive network which is not susceptible to percolative breakdown on volume expansion.

In summary, a polymeric composite hybrid material was fabricated based on a silicone network intercalated into a carbon aerogel-carbon nanotube foam which exhibits a strong temperature dependent conductivity response. The material, below a critical temperature (Tg or Tm of the polymeric network) is electrically insulating. Upon being heated through a phase transition, the conductivity abruptly increases up to 5 orders of magnitude, and this transition has been shown to be fully reversible. The conductance response has been shown to be sensitive to further phase transitions, such as cold-crystallization and melting transitions. The measured effect is a fundamental property of the hybrid network formed, as such it shows a very low hysteresis. And it is believed that this NTC property is common to a range of polymeric architectures. The underlying semiconductor response of the carbon aerogel conducting network is being gated when the polymer is in a glassy or crystalline state and is strongly adsorbed to the surface of the nanotube networks. The free volume expansion associated with Tg and Tm transitions reduces the level of association with the nanotube surfaces, thereby "switching off" the quenching effect. This is the first example of a high performance, low hysteresis negative thermal coefficient material based on a true semiconductor gating mechanism and not conductive phase percolation effects.

As used herein, the singular terms "a," "an," and "the" include plural referents unless the context clearly dictates otherwise. Thus, for example, reference to a compound can include multiple compounds unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A method for sensing temperature-dependent electrical switching response, comprising: exposing a polymer-carbon composite to a temperature change, wherein the polymer-carbon composite comprises (a) a semi-conductive or conductive carbon network intercalated with (b) a polymer matrix, wherein the carbon network comprises at least one covalently bonded carbon material, and wherein the polymer matrix comprises at least one polymer having a net electron withdrawing character and adapted to apply a gating effect on the carbon network; and detecting a change in electrical conductivity of the polymer-carbon composite of at least three orders of magnitude.

2. The method of claim 1, wherein the carbon network comprises carbon nanotube bundles covalently crosslinked by carbon nanoparticles.

3. The method of claim 1, wherein the carbon network comprises graphene sheets covalently crosslinked by carbon bonds.

4. The method of claim 1, wherein the polymer matrix comprises at least one polymer selected from the group consisting of polysiloxanes, polyurethanes, epoxy resins, fluoropolymers, polyolefins, and acrylate polymers.

5. The method of claim 1, wherein the polymer matrix comprises polysiloxane.

6. The method of claim 1, wherein the polymer-carbon composite is a monolith having at least one dimension of 1 cm or more.

7. The method of claim 1, wherein the polymer-carbon composite is insulating at a first temperature below Tg of the polymer and is semiconducting or conducting at a second temperature above Tg of the polymer, and wherein the difference between the first temperature and the second temperature is 50° C. or less.

8. The method of claim 1, wherein the detected change in electrical conductivity of the polymer-carbon composite is substantially free of hysteresis over at least 10 cycles.

9. The method of claim 1, wherein the detected change in electrical conductivity of the polymer-carbon composite is at least four orders of magnitude.

10. The method of claim 1, further comprising sending a warning signal or an actuation signal when the electrical conductivity exceeds or drops below a predetermined threshold.

11. A smart switching device comprising a polymer-carbon composite comprising (a) a semi-conductive or conductive carbon network intercalated with (b) a polymer matrix, wherein the carbon network comprises at least one covalently-bonded carbon material, and wherein the polymer matrix comprises at least one polymer having a net electron withdrawing character and adapted to apply a gating effect on the carbon network, and a switch triggerable by an increase or decrease in electrical conductivity of the polymer-carbon composite of at least three orders or magnitude.

12. The smart switching device of claim 11, wherein the carbon network comprises carbon nanotube bundles covalently crosslinked by carbon nanoparticles.

13. The smart switching device of claim 11, wherein the carbon network comprises graphene sheets covalently crosslinked by carbon bonds.

14. The smart switching device of claim 11, wherein the polymer matrix comprises at least one polymer selected from the group consisting of polysiloxanes, polyurethanes, epoxy resins, fluoropolymers, polyolefins, and acrylate polymers.

15. The smart switching device of claim 11, wherein the polymer matrix comprises polysiloxane.

16. The smart switching device of claim 11, wherein the polymer-carbon composite is a monolith having at least one dimension of 1 cm or more.

17. The smart switching device of claim 11, wherein the polymer-carbon composite is insulating at a first temperature below Tg of the polymer and is semiconducting or conducting at a second temperature above Tg of the polymer, and wherein the difference between the first temperature and the second temperature is 50° C. or less.

18. The smart switching device of claim 11, wherein the switch is triggerable by an increase or decrease in electrical conductivity of the polymer-carbon composite of at least four orders or magnitude.

19. A warning system comprising the smart switching device of claim 11 connected to a warning device configured to produce a warning signal when the electrical conductivity exceeds or drops below a predetermined threshold.

20. An actuation system comprising the smart switching device of claim 11 connected to an actuation device configured to produce an actuation signal when the electrical conductivity exceeds or drops below a predetermined threshold.

* * * * *